United States Patent
Zhang et al.

(10) Patent No.: US 9,760,198 B2
(45) Date of Patent: Sep. 12, 2017

(54) TOUCH CONTROL UNIT, ARRAY SUBSTRATE, DISPLAY DEVICE, AND TOUCH CONTROL METHOD

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Jiuzhan Zhang, Beijing (CN); Ming Hu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 182 days.

(21) Appl. No.: 14/424,818

(22) PCT Filed: May 27, 2014

(86) PCT No.: PCT/CN2014/078535
§ 371 (c)(1),
(2) Date: Feb. 27, 2015

(87) PCT Pub. No.: WO2015/090002
PCT Pub. Date: Jun. 25, 2015

(65) Prior Publication Data
US 2016/0034082 A1 Feb. 4, 2016

(30) Foreign Application Priority Data
Dec. 17, 2013 (CN) .......................... 2013 1 0694938

(51) Int. Cl.
G06F 3/041 (2006.01)
G06F 3/044 (2006.01)
G09G 3/36 (2006.01)

(52) U.S. Cl.
CPC ............ *G06F 3/0412* (2013.01); *G06F 3/044* (2013.01); *G06F 3/0416* (2013.01); *G09G 3/36* (2013.01);
(Continued)

(58) Field of Classification Search
CPC ...... G06F 3/0412; G06F 3/0416; G06F 3/044; G09G 3/36; G09G 3/3648; G09G 2300/08; G09G 2330/06; G09G 2354/00
(Continued)

(56) References Cited

U.S. PATENT DOCUMENTS

| 6,384,878 B1 | 5/2002 | Kwak | |
| 2014/0028612 A1* | 1/2014 | Ahn | ..................... G06F 3/0412 345/174 |

FOREIGN PATENT DOCUMENTS

| CN | 101726890 A | 6/2010 |
| CN | 101930136 A | 12/2010 |

(Continued)

OTHER PUBLICATIONS

International Search Report dated May 27, 2014 corresponding to application No. PCT/CN2014/078535.
(Continued)

*Primary Examiner* — Mark Regn
(74) *Attorney, Agent, or Firm* — Nath, Goldberg & Meyer; Joshua B. Goldberg

(57) ABSTRACT

A touch control unit includes a control module, a sensing module, and an output module. The control module is connected to a control line and the sensing module. The sensing module is connected to the control line and the
(Continued)

output module. The output module is connected to a sensing line and an output line. The control module is used for writing a charging voltage into the sensing module under control of a control signal output from the control line. The sensing module is used for generating a sensing voltage and outputting the sensing voltage to the output module. The output module is used for outputting a touch signal to the output line under control of the sensing signal output from the sensing line. The technical solutions according to the present invention increase the sensitivity of a touch and the display quality of a picture.

14 Claims, 4 Drawing Sheets

(52) U.S. Cl.
CPC ....... *G09G 3/3648* (2013.01); *G09G 2300/08* (2013.01); *G09G 2330/06* (2013.01); *G09G 2354/00* (2013.01)

(58) Field of Classification Search
USPC .......................................................... 345/173
See application file for complete search history.

(56) References Cited

FOREIGN PATENT DOCUMENTS

| | | | |
|---|---|---|---|
| CN | 101726890 B | * | 5/2012 |
| CN | 103677420 A | | 3/2014 |

OTHER PUBLICATIONS

Written Opinion of the International Searching Authority dated Sep. 5, 2014 corresponding to application No. PCT/CN2014/078535.
Notification of the First Office Action dated Oct. 31, 2014 corresponding to Chinese application No. 201310694938.3.
Notification of the Second Office Action dated May 11, 2015 corresponding to Chinese application No. 201310694938.3.

\* cited by examiner

TOUCH CONTROL UNIT, ARRAY SUBSTRATE, DISPLAY DEVICE, AND TOUCH CONTROL METHOD

This is a National Phase Application filed under 35 U.S.C. 371 as a national stage of PCT/CN2014/078535, filed May 27, 2014, an application claiming the benefit of Chinese Application No. 201310694938.3, filed Dec. 17, 2013, the content of each of which is hereby incorporated by reference in its entirety.

FIELD OF THE INVENTION

The present invention relates to the field of display technology, in particular, relates to a touch control unit, an array substrate, a display device, and a touch control method.

BACKGROUND OF THE INVENTION

Nowadays, an in-cell touch technology has become an object getting the attention of major manufacturers. Well-known manufacturers in the world have put a lot of manpower and resources into research and development, improvement of a rate of qualified product, a patent strategy, and other related work for the in-cell touch technology. As a relative popular field at present, the in-cell touch technology has advantages of making an entire display panel have a higher integration level and making the entire display panel lighter and thinner so as to be in line with the trend that consumers pursue after an electronic product. However, as a newly developed technology, the in-cell touch technology still has many problems including a noise problem due to mutual interference between touch and display, a touch sensitivity problem, a qualified rate of in-cell touch products, and the like.

There exists a structure integrating touch and display in the prior art. FIG. 1 is an equivalent circuit diagram of a touch display structure in the prior art. As shown in FIG. 1, the touch display structure includes output lines 1, data lines 4, and gate lines. A touch display unit 2 is defined by the data lines 4 and the gate lines. The touch display unit 2 includes a fourth switch tube T4, a fifth switch tube T5, a storage capacitor Cst, and a liquid crystal capacitor Clc. Wherein, a gate of the fourth switch tube T4 is connected to a gate line Gn, a first electrode of the fourth switch tube T4 is connected to a node P, and a second electrode of the fourth switch tube T4 is connected to a data line 4. A gate of the fifth switch tube T5 is connected to a gate line Gn-1, a first electrode of the fifth switch tube T5 is connected to an output line 1, and a second electrode of the fifth switch tube T5 is connected to the node P. A first terminal of the storage capacitor Cst is connected to a common electrode Vcom, and a second terminal of the storage capacitor Cst is connected to the node P. A first terminal of the liquid crystal capacitor Clc is connected to the common electrode Vcom, and a second terminal of the liquid crystal capacitor Clc is connected to the node P. A capacitance of liquid crystal which is an anisotropic medium is directly related to an orientation and a spacing d of the liquid crystal molecules. Thus, a spacing d of the liquid crystal capacitor Clc changes when a touch occurs, causing a capacitance of the liquid crystal capacitor Clc to change accordingly. Whereas a capacitance of the storage capacitor Cst will not change. If a voltage written into a pixel in a previous frame of picture is Vp, charges stored in the storage capacitor Cst and the liquid crystal capacitor Clc are $Qp=Vp*(CST+CLC)$, where, Vp is a voltage at the node P, CST is a capacitance of the storage capacitor Cst, and CLC is a capacitance of the liquid crystal capacitor Clc. When the gate line $G_{n-1}$ is at a high level, the fifth switch tube T5 is turned on, the voltage Vp at the node P is transferred to a signal processor 3 via the fifth switch tube T5 and an output line 1. The signal processor 3 compares Vp with a reference voltage REF to determine whether a touch occurs at the node P, so that a data line 4 inputs a data signal voltage to a corresponding pixel when the gate line Gn is connected. If a touch does not occur at the node P, a voltage at the node P is the voltage Vp written in a previous frame of picture. If a touch occurs at the node P, considering a case where a change value of the capacitance CLC of the liquid crystal capacitor Clc is ΔCLC, the voltage at the node P changes to Vp' and $Vp'=Vp*(CST+CLC)/(CST+CLC+\Delta CLC)$ due to conservation of charges stored in the storage capacitor Cst and the liquid crystal capacitor Clc. Thus, $\Delta Vp=Vp+-Vp\approx Vp*\Delta CLC/(CST+CLC)/(CST+CLC)$, and the sensitivity of a touch function is directly determined by the magnitude of ΔVp. Further, the magnitude of ΔVp is affected by the Vp, so that the sensitivity of a touch function is affected by the Vp. As shown in FIG. 1, the storage capacitor Cst and the liquid crystal capacitor Clc are formed between the node P and the common electrode Vcom, and the node P is connected to both the first electrode of the fourth switch tube T4 and the second electrode of the fifth switch tube T5. The node P is a pixel electrode, thus the voltage at the node P is a pixel voltage.

There exist the following technical problems in the touch display structure in the prior art:

1) Since a display function and a touch function are integrated into a touch display unit, and a change value of the voltage at a terminal of the storage capacitor and the liquid crystal capacitor is related to the pixel voltage when a touch occurs, the sensitivity of a touch function is directly affected by the pixel voltage, thereby reducing the sensitivity of a touch;

2) Since a display function and a touch function are integrated into a touch display unit, a pixel will be affected by a great deal of noise in the output lines during display, thereby reducing the display quality of a picture; and 3) Since a display function and a touch function are integrated into a touch display unit, it must take a part of time to process a touch signal during display of a frame of picture, which will have an influence on a charging rate of a pixel, thereby reducing the display quality of a picture.

SUMMARY OF THE INVENTION

The present invention provides a touch control unit, an array substrate, a display device, and a touch control method, for increasing the sensitivity of a touch and the display quality of a picture.

In order to achieve the above object, the present invention provides a touch control unit including a control module, a sensing module, and an output module, the control module being connected to a control line and the sensing module, the sensing module being connected to the control line and the output module, and the output module being connected to a sensing line and an output line; wherein the control module is used for writing a charging voltage into the sensing module under control of a control signal output from the control line;

the sensing module is used for generating a sensing voltage and outputting the sensing voltage to the output module; and the output module is used for outputting a touch signal to the output line under control of a sensing signal output from the sensing line.

Preferably, the control module includes a first switch tube; wherein both a control electrode and a first electrode of the first switch tube are connected to the control line, and a second electrode of the first switch tube is connected to the sensing module.

Preferably, the sensing module includes a first capacitor and a second capacitor; and a first terminal of the first capacitor is connected to the control line, and a second terminal of the first capacitor is connected to both a first terminal of the second capacitor and the output module; and a second terminal of the second capacitor is connected to a common electrode.

Preferably, the output module includes a second switch tube and a third switch tube; wherein a control electrode of the second switch tube is connected to the sensing module, a first electrode of the second switch tube is connected to the sensing line, and a second electrode of the second switch tube is connected to a first electrode of the third switch tube; and a control electrode of the third switch tube is connected to the sensing line, and a second electrode of the third switch tube is connected to the output line.

Preferably, when a touch occurs, a change value $\Delta VA$ of the sensing voltage satisfies that $\Delta VA=\{(CR*\Delta CL)*\Delta V\}/\{(CR+CL+\Delta CL)*(CR+CL)\}$, where, CR is a capacitance of the first capacitor, CL is a capacitance of the second capacitor, $\Delta CL$ is a change value of the capacitance of the second capacitor, and $\Delta V$ is a change value of a voltage of the control signal.

Preferably, the first capacitor is a storage capacitor, and the second capacitor is a liquid crystal capacitor.

Preferably, the first switch tube, the second switch tube, and the third switch tube are thin film transistors.

In order to achieve the above object, the present invention provides an array substrate including gate lines and data lines. The gate lines and the data lines define pixel units. Each of the pixel units is provided with a display control unit and a pixel electrode therein. The array substrate further includes control lines, sensing lines, output lines, and the touch control units as described above, and each of the touch control units is arranged corresponding to at least one of the pixel units.

Preferably, each of the touch control units is arranged corresponding to one pixel which includes a plurality of the pixel units.

In order to achieve the above object, the present invention provides a display device including the array substrate as described above.

In order to achieve the above object, the present invention provides a touch control method of the touch control unit, including:

a step of writing the charging voltage into the sensing module by the control module under control of the control signal output from the control line in a charging stage;

a step of generating the sensing voltage and outputting the sensing voltage to the output module by the sensing module in a sensing stage; and a step of outputting the touch signal to the output line by the output module under control of the sensing signal output from the sensing line in an output stage.

Preferably, in the touch control method, the step of writing the charging voltage into the sensing module by the control module under control of the control signal output from the control line in a charging stage includes: a step of turning on the first switch tube under control of the control signal output from the control line and writing the charging voltage into the first capacitor and the second capacitor in the charging stage;

the step of generating the sensing voltage and outputting the sensing voltage to the output module by the sensing module in a sensing stage includes: a step of turning off the first switch tube under control of the control signal output from the control line and charging and discharging the first capacitor and the second capacitor to generate the sensing voltage in the sensing stage; and the step of outputting the touch signal to the output line by the output module under control of the sensing signal output from the sensing line in an output stage includes: a step of turning on the third switch tube under control of the sensing signal output from the sensing line and outputting an electric current from the second switch tube to the output line so as to output the touch signal to the output line in the output stage.

Preferably, the step of turning off the first switch tube under control of the control signal output from the control line and charging and discharging the first capacitor and the second capacitor to generate the sensing voltage includes:

turning off the first switch tube under control of the control signal output from the control line, changing the capacitance of the second capacitor, and charging and discharging the first capacitor and the second capacitor to generate the sensing voltage when a touch occurs.

The advantageous technical effects of the present invention are as follows.

In the technical solutions of the touch control unit, the array substrate, the display device, and the touch control method according to the present invention, the touch control unit can implement a touch function separately, enabling a display function and the touch function to be set separately. Thus, the sensitivity of the touch function will not affected by a pixel voltage, thereby increasing the sensitivity of a touch. A pixel will not be affected by a great deal of noise in the output line during display, thereby increasing the display quality of a picture. Since the touch control unit implements a touch function separately, it is not necessary to take a part of time to process a touch signal during display of a frame of picture, which has no influence on a charging rate of a pixel, thereby increasing the display quality of a picture.

DETAILED DESCRIPTION OF THE EMBODIMENTS

For better understanding the technical solutions of the present invention by a person skilled in the art, a touch control unit, an array substrate, a display device, and a touch control method according to the present invention will be described below in detail with reference to the drawings.

Figure 1:
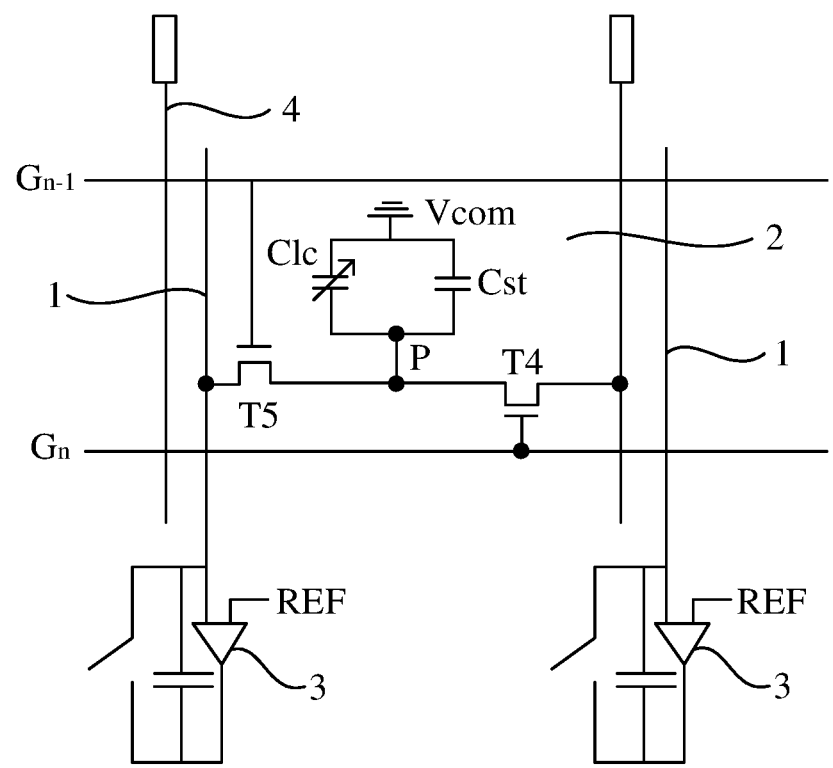
FIG. 1 is an equivalent circuit diagram of a touch display structure in the prior art.
Figure 2:
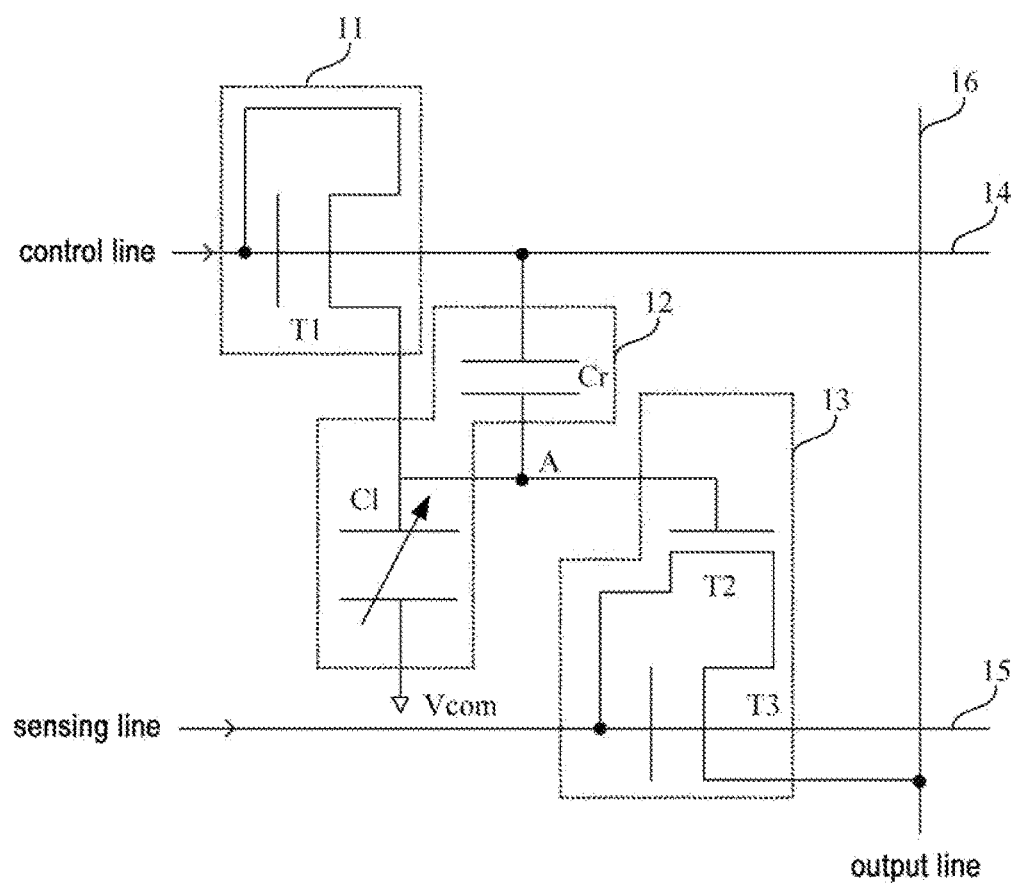
FIG. 2 is an equivalent circuit diagram of a touch control unit according to Embodiment 1 of the present invention.

FIG. 2 is an equivalent circuit diagram of a touch control unit according to Embodiment 1 of the present invention. As shown in FIG. 2, the touch control unit includes a control module 11, a sensing module 12, and an output module 13. The control module 11 is connected to a control line 14 and the sensing module 12. The sensing module 12 is connected to the control line 14 and the output module 13. The output module 13 is connected to a sensing line 15 and an output line 16.

The control module 11 is used for writing a charging voltage into the sensing module 12 under control of a control signal output from the control line 14. The sensing module 12 is used for generating a sensing voltage and outputting the sensing voltage to the output module 13. The output module 13 is used for outputting a touch signal to the output line 16 under control of the sensing signal output from the sensing line 15.

In the present embodiment, the control module 11 may include a first switch tube T1. Both a control electrode and a first electrode of the first switch tube T1 are connected to the control line 14, and a second electrode of the first switch tube T1 is connected to the sensing module 12.

In the present embodiment, the sensing module 12 includes a first capacitor Cr and a second capacitor Cl. A first terminal of the first capacitor Cr is connected to the control line 14, and a second terminal of the first capacitor Cr is connected to both a first terminal of the second capacitor Cl and the output module 13. A second terminal of the second capacitor Cl is connected to a common electrode Vcom. Specifically, the second electrode of the first switch tube T1 is connected to both the second terminal of the first capacitor Cr and the first terminal of the second capacitor Cl.

In the present embodiment, the output module 13 includes a second switch tube T2 and a third switch tube T3. A control electrode of the second switch tube T2 is connected to the sensing module 12. A first electrode of the second switch tube T2 is connected to the sensing line 15, and a second electrode of the second switch tube T2 is connected to a first electrode of the third switch tube T3. A control electrode of the third switch tube T3 is connected to the sensing line 15, and a second electrode of the third switch tube T3 is connected to the output line 16. Specifically, the control electrode of the second switch tube T2 is connected to both the second terminal of the first capacitor Cr and the first terminal of the second capacitor Cl.

In the present embodiment, preferably, the first capacitor Cr is a storage capacitor, and the second capacitor Cl is a liquid crystal capacitor. Wherein, a capacitance of the liquid crystal capacitor Cl will change when a touch occurs.

In the present embodiment, preferably, all of the first switch tube T1, the second switch tube T2, and the third switch tube T3 may be thin film transistors (TFTs). When each of the above switch tubes is a TFT, the control electrode of the switch tube may be a gate, the first electrode of the switch tube may be a source or a drain, and the second electrode of the switch tube may be a drain or a source.

Figure 3:
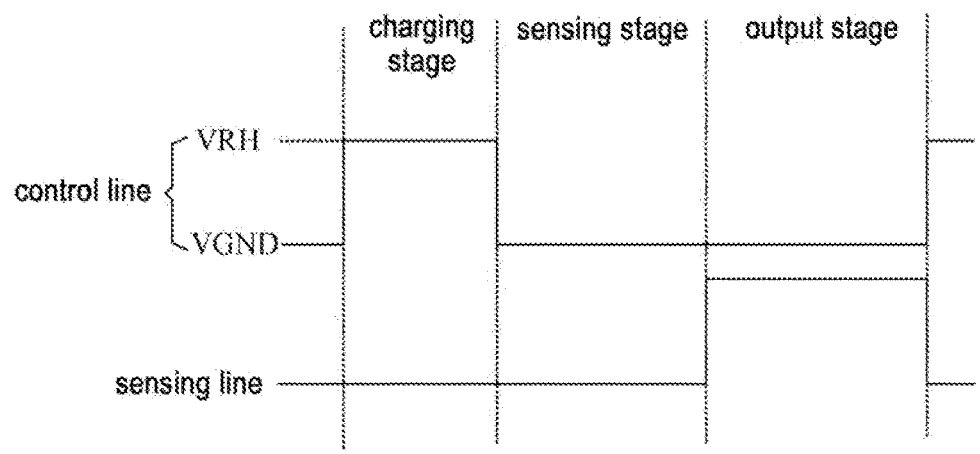
FIG. 3 is a schematic diagram showing an operation timing of the touch control unit according to Embodiment 1.

FIG. 3 is a schematic diagram showing an operation timing of the touch control unit according to Embodiment 1. The operation process of the touch control unit according to the present embodiment will be described below in detail with reference to FIGS. 2 and 3.

In a charging stage, the control module 11 writes a charging voltage into the sensing module 12 under control of a control signal output from the control line 14. Specifically, the first switch tube T1 is turned on under control of the control signal output from the control line 14, and writes the charging voltage into the first capacitor Cr and the second capacitor Cl. As shown in FIG. 3, in the charging stage, the control signal output from the control line 14 is a high level signal, and a voltage value of the control signal is VRH at this time. The first switch tube T1 is in a turned-on state under control of the high level signal, and the control line 14 writes the charging voltage into the first capacitor Cr and the second capacitor Cl via the first switch tube T1 which is turned on.

In a sensing stage, the sensing module 12 generates a sensing voltage and outputting the sensing voltage to the output module 13. Specifically, the first capacitor Cr and the second capacitor Cl are charged and discharged to generate the sensing voltage. During the above process, the sum of charges stored in the first capacitor Cr and charges stored in the second capacitor Cl is conservational, and the charges are redistributed in the two capacitors to achieve a new equilibrium. Thus, a charging phenomenon and a discharging phenomenon will occur in the first capacitor Cr and the second capacitor Cl to achieve conservation of the sum of the charges. As shown in FIG. 3, in the sensing stage, the control signal output from the control line 14 is a low level signal, and a voltage value of the control signal is VGND at this time. The second switch tube T2 is in a turned-off state under control of the low level signal, and the control line 14 does not write the charging voltage into the first capacitor Cr and the second capacitor Cl anymore. The sensing voltage output from the sensing module 12 to the output module 13 is a voltage VA at point A as shown in FIG. 2. When a touch occurs, a capacitance of the second capacitor Cl changes, and the first capacitor Cr and the second capacitor Cl are charged and discharged to generate a sensing voltage. The sensing voltage VA will change as compared with a sensing voltage when a touch does not occur. A change value $\Delta VA$ of the sensing voltage satisfies that $\Delta VA=\{(CR*\Delta CL)*\Delta V\}/\{(CR+CL+\Delta CL)*(CR+CL)\}$, where, CR is a capacitance of the first capacitor Cr, CL is a capacitance (i.e., a capacitance when a touch does not occur) of the second capacitor Cl, $\Delta CL$ is a change value of the capacitance of the second capacitor, and $\Delta V$ is a change value of a voltage of the control signal. As shown in FIG. 3, $\Delta V=VRH-VGND$. Since an electric current flowing through the second switch tube T2 is positively correlated with the sensing voltage VA, an electric current flowing through the second switch tube T2 when a touch occurs will change accordingly relative to an electric current flowing through the second switch tube T2 when a touch does not occur. It can be seen from the above equation for the change value $\Delta VA$ of the sensing voltage VA that, the $\Delta VA$ is independent of a pixel voltage, so that the sensitivity of a touch function will not affected by the pixel voltage. When the sensing signal output from the sensing line 15 is at a low level, the third switch tube T3 is turned off, and the first electrode of the second switch tube T2 is also at a low level. Thus, a leakage current flowing from the second switch tube T2 to the output line 16 via the third switch tube T3 is very small, so that the noise in the output line 16 is small. Therefore, the sensitivity of a touch is further increased.

In an output stage, the output module 13 outputs a touch signal to the output line 16 under control of the sensing signal output from the sensing line 15. Specifically, the third switch tube T3 is turned on under control of the sensing signal output from the sensing line 15, and outputs an electric current from the second switch tube T2 to the output line 16, so as to output the touch signal to the output line 16. As shown in FIG. 3, in the output stage, the sensing signal output from the sensing line 15 is a high level signal. The third switch tube T3 is in a turned-on state under control of the high level signal, so as to output the electric current from the second switch tube T2 to the output line 16, thereby outputting the touch signal to the output line 16. Further, the output line 16 outputs the touch signal to a peripheral processor, which can determine whether a touch occurs according to the touch signal. For example, the peripheral processor can determine whether a touch occurs by comparing the touch signal with a reference signal.

Figure 4:
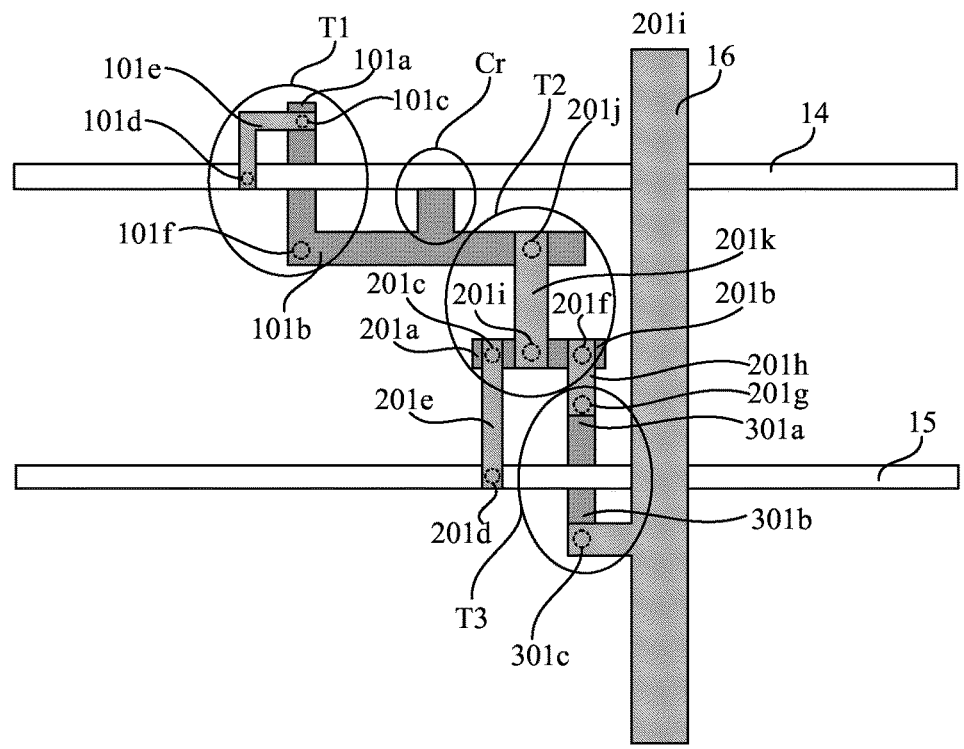
FIG. 4 is a schematic diagram showing the configuration of the touch control unit according to Embodiment 1 of the present invention.

The equivalent circuit diagram of the touch control unit as shown in FIG. 2 may be implemented by using a plurality of structures. A specific configuration of the touch control unit as shown in FIG. 2 is described below by taking one structure as an example. FIG. 4 is a schematic diagram showing a configuration of the touch control unit according to Embodiment 1 of the present invention. As shown in FIG. 4, a first electrode 101a and a second electrode 101b of the first switch tube T1, a first electrode 201a and a second electrode 201b of the first switch tube T2, as well as a first electrode 301a and a second electrode 301b of the third switch tube T3 are arranged in a single layer. A pattern of an active layer is formed on the first electrode and the second electrode of each of the switch tubes. One or more gate insulating layers are formed on the pattern of the active layer. A material of the each of the gate insulating layers may be SiOx or SiNx. The control line 14 and the sensing line 15 are formed on the gate insulating layers, and are arranged in a single layer. Specifically, a first metal layer is formed on the gate insulating layers, and a patterning process is performed on the first metal layer, thereby forming the control line 14 and the sensing line 15. The control electrode of the first switch tube T1 is a part of the control line 14. The control electrode (not shown in FIG. 4) of the second switch tube T2, the control line 14, and the sensing line 15 are arranged in a single layer. The control electrode of the third switch tube T3 is a part of the sensing line 15. One or more spacer layers are formed on the control electrodes of the three switch tubes. A material of each of the spacer layers may be SiOx or SiNx. The first electrode 101a of the first switch tube T1 is connected to a first connection pattern 101e and the control line 14 through vias 101c and 101d, wherein, the first connection pattern 101e is filled in the vias 101c and 101d. The first terminal of the first capacitor Cr is a part of the control line 14, and the second terminal of the first capacitor Cr is a part of the second electrode 101b of the first switch tube T1. The gate insulating layer is located between the first terminal and the second terminal of the first capacitor Cr. The first electrode 201a of the second switch tube T2 is connected to the sensing line 15 through a via 201c, a via 201d, and a second connection pattern 201e, wherein, the second connection pattern 201e is filled in the vias 201c and 201d. The second electrode 201b of the second switch tube T2 is connected to the first electrode 301a of the third switch tube T3 through a via 201f, a via 201g, and a third connection pattern 201h, wherein, the third connection pattern 201h is filled in the vias 201f and 201g. The control electrode of the second switch tube T2 is connected to the second electrode 101b of the first switch tube through a via 201i, a via 201j, and a fourth connection pattern 201k, wherein, the fourth connection pattern 201k is filled in the vias 201i and 201j. The second electrode 301b of the third switch tube T3 is connected to the output line 16 through a via 301c, wherein, the output line 16 is filled in the via 301c. The first connection pattern 101e, the second connection pattern 201e, the third connection pattern 201h, and the output line 16 are arranged in a single layer. Specifically, a second metal layer is formed on a passivation layer, and a patterning process is performed on the second metal layer, thereby forming the first connection pattern 101e, the second connection pattern 201e, the third connection pattern 201h, and the output line 16.

Figure 5:
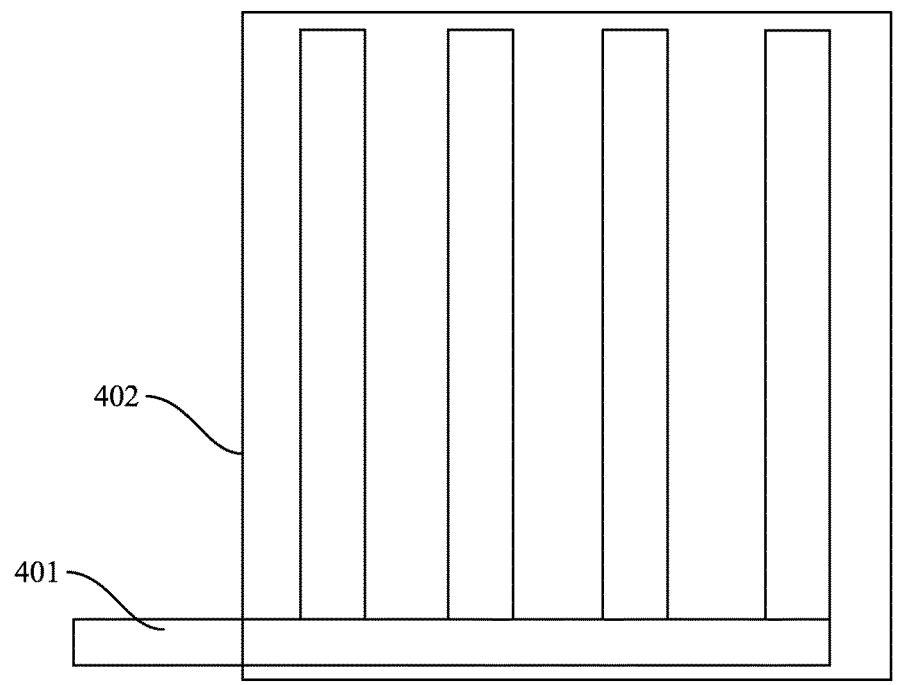
FIG. 5 is a schematic diagram showing the structure of a common electrode and a pixel electrode of the touch control unit as shown in FIG. 4.

FIG. 5 is a schematic diagram showing the structure of a common electrode and a pixel electrode of the touch control unit as shown in FIG. 4. As shown in FIGS. 4 and 5, a first insulating layer is formed on the first connection pattern 101e, the second connection pattern 201e, the third connection pattern 201h, and the output line 16 as shown in FIG. 4, and a material of the first insulating layer is an organic material. There are provided a pixel electrode 401 on the first insulating layer and a common electrode 402 on the pixel electrode. A second insulating layer is formed between the pixel electrode 401 and common electrode 402, and a material of the second insulating layer may be SiNx. The pixel electrode 401 is of a plate-shaped structure, and the common electrode 402 is of a comb-shaped structure. Or, alternatively, the pixel electrode 401 is of a comb-shaped structure, and the common electrode 402 is of a plate-shaped structure. A material of each of the pixel electrode 401 and common electrode 402 may be a transparent conductive material, such as indium tin oxide (ITO). The pixel electrode 401 is connected to the second electrode 101b of the first switch tube T1 through a via 101f, wherein, the pixel electrode 401 is filled in the via 101f.

The touch control unit as shown in FIGS. 4 and 5 can be applied to an in-plane switching (IPS) display device. In a practical application, the configuration of the touch control unit can also be applied to an advanced super dimension switch (ADS) display device, and detailed description of the configuration of the touch control unit applied to the ADS display device is omitted herein. In a practical application, the touch control unit can further be applied to a display device of another display mode, such as a twisted nematic (TN) display device, or a vertical alignment (VA) display device.

The touch control unit as shown in FIGS. 4 and 5 is manufactured by a polysilican process. In a practical application, the touch control unit can also be manufactured by an oxide process or an amorphous silicon process.

The touch control unit according to the present embodiment can implement a touch function separately, enabling a display function and the touch function to be set separately. Thus, the sensitivity of the touch function will not affected by a pixel voltage, thereby increasing the sensitivity of a touch. A pixel will not be affected by a great deal of noise in the output line during display, thereby increasing the display quality of a picture. Since the touch control unit implements a touch function separately, it is not necessary to take a part of time to process a touch signal during display of a frame of picture, which has no influence on a charging rate of a pixel, thereby increasing the display quality of a picture. The touch control unit is configured in such a way that a touch function and a display function will not interfere with each other, thereby reducing mutual interference between the touch function and the display function. The touch control unit has a simple layout, and can be implemented easily.

Figure 6:
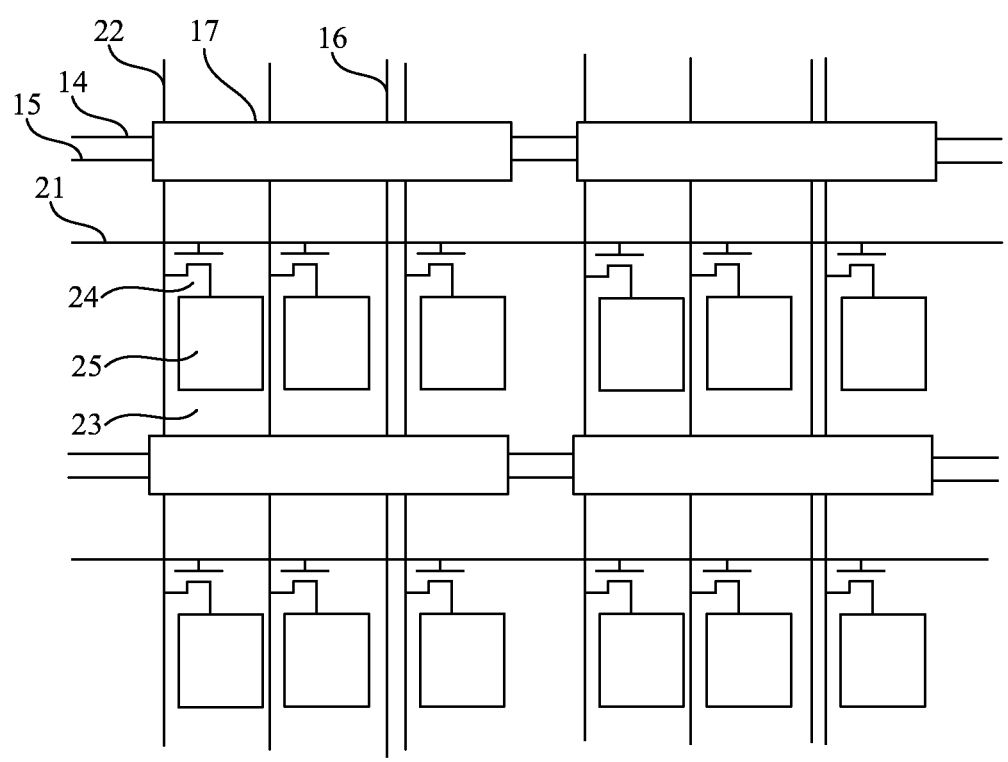
FIG. 6 is a schematic diagram showing the configuration of an array substrate according to Embodiment 2 of the present invention.

FIG. 6 is a schematic diagram showing a configuration of an array substrate according to Embodiment 2 of the present invention. As shown in FIG. 6, the array substrate includes gate lines 21, data lines 22, the control lines 14, the sensing lines 15, the output lines 16, and touch control units 17. The gate lines 21 and the data lines 22 define pixel units 23, and each of the pixel units 23 is provided with a display control unit 24 and a pixel electrode 25 therein. Each of the touch control units 17 is arranged corresponding to at least one of the pixel units 23.

In the present embodiment, each of the touch control units 17 is arranged corresponding to one pixel which includes a plurality of the pixel units 23. In the present embodiment, one pixel includes three pixel units 23. That is, each of the touch control units 17 is arranged corresponding to three pixel units 23.

In the present embodiment, the display control unit 24 may be a TFT.

In the present embodiment, each of the touch control units 17 may be the touch control unit according to Embodiment 1 as described above, and detailed description thereof is omitted herein.

In the technical solutions of the array substrate according to the present embodiment, the touch control unit can implement a touch function separately, whereas a display function is implemented by the display control unit, enabling the display function and the touch function to be set separately. Thus, the sensitivity of the touch function will not affected by a pixel voltage, thereby increasing the sensitivity of a touch. A pixel will not be affected by a great deal of noise in the output line during display, thereby increasing the display quality of a picture. Since the touch control unit implements a touch function separately, it is not necessary to take a part of time to process a touch signal during display of a frame of picture, which has no influence on a charging rate of a pixel, thereby increasing the display quality of a picture. The touch control unit is configured in such a way that a touch function and a display function will not interfere with each other, thereby reducing mutual interference between the touch function and the display function. The touch control unit has a simple layout, and can be implemented easily.

Embodiment 3 of the present invention provides a display device including an array substrate which may be the array substrate according to Embodiment 2 as described above, and detailed description thereof is omitted herein.

The display device may be any product or component having a display function, such as a liquid crystal display panel, electronic paper, a mobile phone, a tablet computer, a television set, a display, a laptop computer, a digital photo frame, a navigator, and the like. Preferably, the display device may be an IPS display device or an ADS display device.

In the technical solutions of the display device according to the present embodiment, the touch control unit can implement a touch function separately, whereas a display function is implemented by the display control unit, enabling the display function and the touch function to be set separately. Thus, the sensitivity of the touch function will not affected by a pixel voltage, thereby increasing the sensitivity of a touch. A pixel will not be affected by a great deal of noise in the output line during display, thereby increasing the display quality of a picture. Since the touch control unit implements a touch function separately, it is not necessary to take a part of time to process a touch signal during display of a frame of picture, which has no influence on a charging rate of a pixel, thereby increasing the display quality of a picture. The touch control unit is configured in such a way that a touch function and a display function will not interfere with each other, thereby reducing mutual interference between the touch function and the display function. The touch control unit has a simple layout, and can be implemented easily.

Embodiment 4 of the present invention provides a touch control method, including the following steps:

Step 101: writing a charging voltage into the sensing module by the control module under control of a control signal output from the control line in a charging stage;

Step 102: generating a sensing voltage and outputting the sensing voltage to the output module by the sensing module in a sensing stage; and Step 103: outputting a touch signal to the output line by the output module under control of the sensing signal output from the sensing line in an output stage.

The touch control method according to the present embodiment may be implemented with the touch control unit according to Embodiment 1 as described above.

Specifically, in the touch control method:

The Step 101 may specifically include: in the charging stage, turning on the first switch tube under control of the control signal output from the control line, and writing the charging voltage into the first capacitor and the second capacitor.

The Step 102 may specifically include: in the sensing stage, turning off the first switch tube under control of the control signal output from the control line, and charging and discharging the first capacitor and the second capacitor to generate the sensing voltage. Especially, when a touch occurs, the present step includes turning off the first switch tube under control of the control signal output from the control line, changing the capacitance of the second capacitor, and charging and discharging the first capacitor and the second capacitor to generate the sensing voltage.

The Step 103 may specifically include: in the output stage, turning on the third switch tube under control of the sensing signal output from the sensing line, and outputting an electric current from the second switch tube to the output line so as to output the touch signal to the output line.

In the technical solutions of the touch control method according to the present embodiment, the touch control method can implement a touch function separately, enabling a display function and the touch function to be set separately. Thus, the sensitivity of the touch function will not affected by a pixel voltage, thereby increasing the sensitivity of a touch. A pixel will not be affected by a great deal of noise in the output line during display, thereby increasing the display quality of a picture. Since the touch control method implements a touch function separately, it is not necessary to take a part of time to process a touch signal during display of a frame of picture, which has no influence on a charging rate of a pixel, thereby increasing the display quality of a picture.

It should be understood that, the above embodiments are only exemplary embodiments for the purpose of explaining the principle of the present invention, and the present invention is not limited thereto. For a person having ordinary skill in the art, various improvements and modifications may be applied to the present invention without departing from the spirit and essence of the present invention. These improvements and modifications also fall within the protection scope of the present invention.

What is claimed is:

1. A touch control unit including a control module, a sensing module, and an output module, the control module being connected to a control line and the sensing module, the sensing module being connected to the control line and the output module, and the output module being connected to a sensing line and an output line; wherein the control module is used for writing a charging voltage into the sensing module under control of a control signal output from the control line;

the sensing module is used for generating a sensing voltage and outputting the sensing voltage to the output module; and the output module is used for outputting a touch signal to the output line under control of the sensing signal output from the sensing line;

wherein, the control module includes a first switch tube; and both a control electrode and a first electrode of the first switch tube are connected to the control line, and a second electrode of the first switch tube is connected to the sensing module, wherein, the output module includes a second switch tube and a third switch tube, a control electrode of second switch tube, is directly connected to the second electrode of the first switch tube, and both a first electrode of the second switch tube and a control electrode of the third switch tube are directly connected to the sensing line.

2. The touch control unit according to claim 1, wherein, the sensing module includes a first capacitor and a second capacitor;

a first terminal of the first capacitor is connected to the control line, and a second terminal of the first capacitor is connected to both a first terminal of the second capacitor and the output module; and a second terminal of the second capacitor is connected to a common electrode.

3. The touch control unit according to claim 2, wherein, a second electrode of the second switch tube is connected to a first electrode of the third switch tube; and a second electrode of the third switch tube is connected to the output line.

4. The touch control unit according to claim 3, wherein, when a touch occurs, a change value ΔVA of the sensing voltage satisfies that $$\Delta VA = \{(CR*\Delta CL)*\Delta V\}/\{(CR+CL+\Delta CL)*(CR+CL)\},$$

where, CR is a capacitance of the first capacitor, CL is a capacitance of the second capacitor, ΔCL is a change value of the capacitance of the second capacitor, and ΔV is a change value of a voltage of the control signal.

5. The touch control unit according to claim 4, wherein, the first capacitor is a storage capacitor, and the second capacitor is a liquid crystal capacitor.

6. The touch control unit according to claim 3, wherein, the first capacitor is a storage capacitor, and the second capacitor is a liquid crystal capacitor.

7. The touch control unit according to claim 3, wherein, the first switch tube, the second switch tube, and the third switch tube are thin film transistors.

8. The touch control unit according to claim 2, wherein, when a touch occurs, a change value ΔVA of the sensing voltage satisfies that $$\Delta VA = \{(CR*\Delta CL)*\Delta V\}/\{(CR+CL+\Delta CL)*(CR+CL)\},$$

where, CR is a capacitance of the first capacitor, CL is a capacitance of the second capacitor, ΔCL is a change value of the capacitance of the second capacitor, and ΔV is a change value of a voltage of the control signal.

9. The touch control unit according to claim 8, wherein, the first capacitor is a storage capacitor, and the second capacitor is a liquid crystal capacitor.

10. The touch control unit according to claim 2, wherein, the first capacitor is a storage capacitor, and the second capacitor is a liquid crystal capacitor.

11. An array substrate including gate lines and data lines, the gate lines and the data lines defining pixel units, each of the pixel units being provided with a display control unit and a pixel electrode therein, wherein, the array substrate further includes control lines, sensing lines, output lines, and the touch control units according to claim 1, and each of the touch control units is arranged corresponding to at least one of the pixel units.

12. The array substrate according to claim 11, wherein, each of the touch control units is arranged corresponding to one pixel which includes a plurality of the pixel units.

13. A display device including the array substrate according to claim 11.

14. The display device according to claim 13, wherein, each of the touch control units is arranged corresponding to one pixel which includes a plurality of the pixel units.

* * * * *